(12) United States Patent
Nakamura et al.

(10) Patent No.: US 11,668,824 B2
(45) Date of Patent: Jun. 6, 2023

(54) OBSTACLE DETERMINATION APPARATUS AND VEHICLE

(71) Applicant: Panasonic Intellectual Property Management Co., Ltd., Osaka (JP)

(72) Inventors: Yusuke Nakamura, Kanagawa (JP); Ryutaro Seno, Kanagawa (JP); Shingo Kawahara, Kanagawa (JP); Toru Chikamitsu, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 147 days.

(21) Appl. No.: 17/388,844

(22) Filed: Jul. 29, 2021

(65) Prior Publication Data
US 2022/0043146 A1 Feb. 10, 2022

(30) Foreign Application Priority Data
Aug. 4, 2020 (JP) .............................. JP2020-132554

(51) Int. Cl.
*G01S 15/931* (2020.01)

(52) U.S. Cl.
CPC .................................. *G01S 15/931* (2013.01)

(58) Field of Classification Search
CPC ........ G01S 15/931; G01S 15/08; G01S 15/18; G01S 7/52004; G01S 2015/938; G01S 2015/937; G01S 2015/932; B60W 30/0956; B60W 2520/06; B60W 2554/80; B60W 2420/54

See application file for complete search history.

(56) References Cited

U.S. PATENT DOCUMENTS

| | | | | |
|---|---|---|---|---|
| 8,248,887 B2* | 8/2012 | Akiyama | ................ | G01S 7/539 367/98 |
| 9,903,942 B2* | 2/2018 | Harada | ................ | G01S 15/931 |
| 11,295,547 B2* | 4/2022 | Biswas | ................ | G01S 15/08 |
| 11,360,212 B2* | 6/2022 | Nomura | ................ | G01S 15/93 |
| 2008/0259730 A1* | 10/2008 | Di Federico | ............ | G01J 5/044 367/118 |
| 2009/0224959 A1* | 9/2009 | Matsukawa | ........... | G01S 15/931 342/73 |
| 2011/0241858 A1* | 10/2011 | Tsuzuki | .................... | G01S 7/54 340/435 |
| 2012/0170411 A1* | 7/2012 | Suzuki | .................. | G01S 7/5276 367/99 |
| 2015/0323668 A1* | 11/2015 | Heimberger | ............ | G01S 15/66 367/99 |
| 2016/0069990 A1* | 3/2016 | Harada | ................... | G01S 15/42 367/98 |

(Continued)

FOREIGN PATENT DOCUMENTS

JP 2017-015494 1/2017

*Primary Examiner* — Daniel L Murphy
*Assistant Examiner* — Amie M Ndure
(74) *Attorney, Agent, or Firm* — Greenblum & Bernstein, P.L.C.

(57) ABSTRACT

Provided is an obstacle determination apparatus including: a first determiner determining a difference in a propagation distance or a propagation time between a first round-trip path of a detection wave and a second round-trip path of a detection wave; and a second determiner determining whether the object is an obstacle based on a determination result of the first determiner.

20 Claims, 8 Drawing Sheets

(56) References Cited

U.S. PATENT DOCUMENTS

| | | | |
|---|---|---|---|
| 2016/0116583 A1* | 4/2016 | Fukuman | G01S 7/527 |
| | | | 342/59 |
| 2017/0227640 A1* | 8/2017 | Nomura | G01S 7/524 |
| 2019/0154439 A1* | 5/2019 | Binder | G01B 11/26 |
| 2019/0196010 A1* | 6/2019 | Sugae | G01S 15/104 |
| 2020/0096633 A1* | 3/2020 | Matsuura | G01S 15/04 |
| 2020/0195833 A1* | 6/2020 | Sivan | H04W 4/80 |

\* cited by examiner

FIG. 8

OBSTACLE DETERMINATION APPARATUS AND VEHICLE

TECHNICAL FIELD

The present disclosure relates to an obstacle determination apparatus and a vehicle.

BACKGROUND ART

Conventionally, detection apparatuses have been known, which are capable of detecting obstacles such as walls around vehicles by mounting detectors (e.g., ultrasonic sensors) to the vehicles (moving bodies). For example, as the related art, a configuration has been known, which is capable of determining whether an object is a level difference (or stepped surface) on a road surface, based on an inter-coordinate distance between the first coordinates and the second coordinates which are calculated on the basis of two sensors and reflection intensity on the basis of the two sensors.

CITATION LIST

Patent Literature

PTL 1
Japanese Patent Application Laid-Open No. 2017-15494

Solution to Problem

An obstacle determination apparatus according to an embodiment of the present disclosure includes:

a first determiner determining a difference in a propagation distance or a propagation time between a first round-trip path of a detection wave between a first position of a moving body and an object, and a second round-trip path of a detection wave from the first position to a second position of the moving body via the object, the second position being different from the first position; and a second determiner determining whether the object is an obstacle based on a determination result of the first determiner.

A vehicle according to an embodiment of the present disclosure includes:

an obstacle determination apparatus;

a first detector being provided at a first position, transmitting a detection wave for detecting an object, and receiving a first reflection wave resulting from the transmitted detection wave being reflected from the object; and a second detector being provided at a second position and receiving a second reflection wave resulting from the detection wave being reflected from the object, wherein the obstacle determination apparatus includes:

a first determiner determining a difference in a propagation distance or a propagation time between a first round-trip path of a detection wave between the first position of a moving body and an object, and a second round-trip path of a detection wave from the first position to the second position of the moving body via the object, the second position being different from the first position; and a second determiner determining whether the object is an obstacle based on a determination result of the first determiner.

Advantageous Effects of Invention

According to an embodiment of the present disclosure, it is possible to improve determination accuracy of obstacles.

DESCRIPTION OF EMBODIMENTS

First Embodiment

Figure 1:
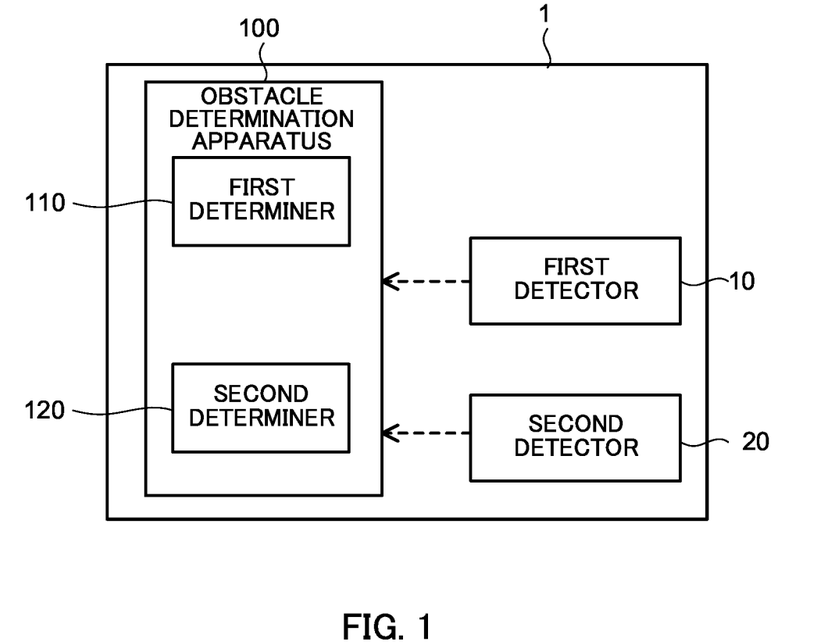
FIG. 1 is a block diagram illustrating a vehicle to which an obstacle determination apparatus according to a first embodiment of the present disclosure is applied.

Hereinafter, an embodiment of the present disclosure will be described in detail with reference to the accompanying drawings. FIG. 1 is a block diagram illustrating vehicle 1 to which obstacle determination apparatus 100 according to a first embodiment of the present disclosure is applied.

As illustrated in FIG. 1, vehicle 1 is a moving body capable of moving in a predetermined traveling direction and includes first detector 10, second detector 20, and obstacle determination apparatus 100.

Figure 2A:
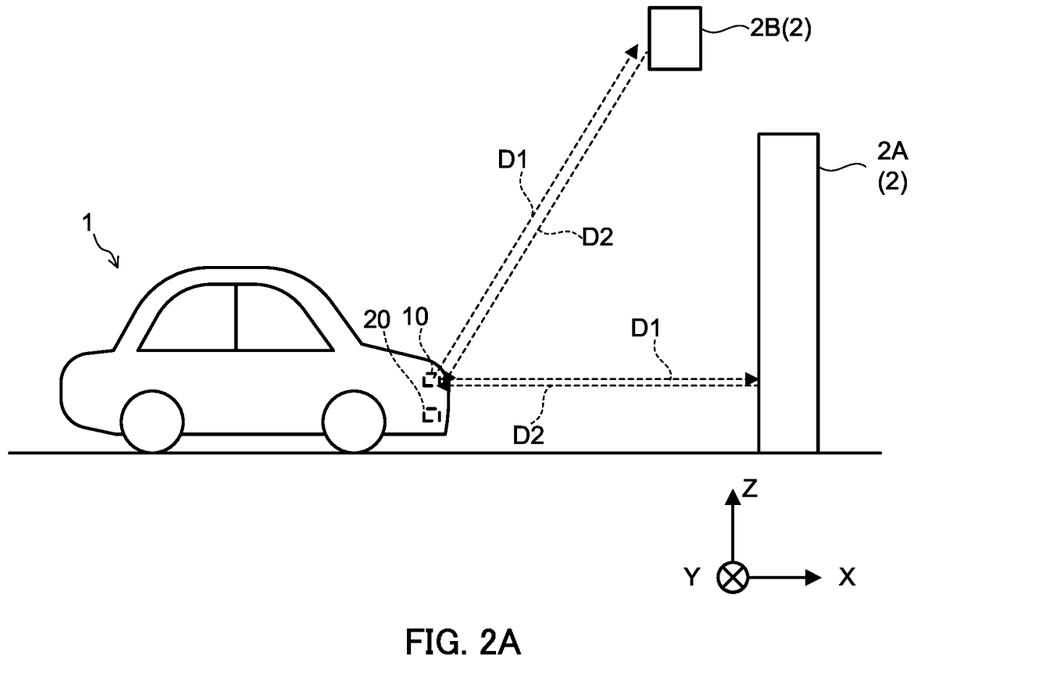
FIG. 2A describes a first round-trip path by a first detector.
Figure 2B:
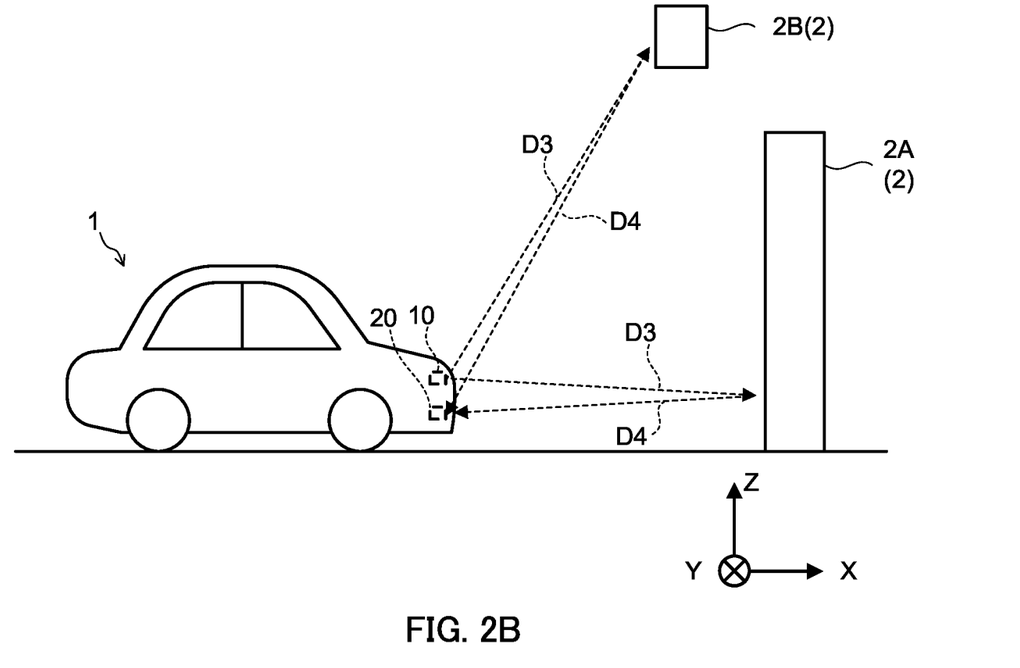
FIG. 2B describes a second round-trip path by a first detector and a second detector.

As illustrated in FIGS. 2A and 2B, first detector 10 and second detector 20 are, for example, ultrasonic sensors, and are provided in a front part of vehicle 1 to detect object 2 in front of vehicle 1.

In the following description, an orthogonal coordinate system (X, Y, and Z) will be used. The same orthogonal coordinate system (X, Y, and Z) is used in figures described later. For example, an X direction indicates a forward and backward direction of vehicle 1 (traveling direction), a Y direction indicates a left and right direction of vehicle 1, and a Z direction indicates an upward and downward direction of vehicle 1 (height direction).

As illustrated in FIG. 2A, first detector 10 is provided at the first position in the front part of vehicle 1, transmits detection wave D1 for detecting object 2, and receives first reflection wave D2 resulting from transmitted detection wave D1 being reflected from the object. Note that, first detector 10 may receive a reflection wave based on the second detection wave transmitted by second detector 20.

Second detector 20 is provided at the second position in the front part of vehicle 1 and receives second reflection wave D4 resulting from transmitted detection wave D3, which has been transmitted by the first detector 10, being reflected from the object. Note that, second detector 20 may transmit the second detection wave and receive the reflection wave based on the second detection wave.

The first position and second position are different from each other in height positions in vehicle 1 (positions in the Z direction). Specifically, the first position (position of first detector 10) is higher than the second position (position of second detector 20). Note that, a positional relationship between first detector 10 and second detector 20 may be reversed.

As illustrated in FIG. 1, obstacle determination apparatus 100 includes a Central Processing Unit (CPU), a Read Only Memory (ROM), a Random Access Memory (RAM), and an input-output circuit (not illustrated). Obstacle determination apparatus 100 determines, for example, whether object 2 in the traveling direction (X direction) of vehicle 1 is an obstacle or a non-obstacle based on a preset program. Obstacle determination apparatus 100 includes first determiner 110 and second determiner 120.

First determiner 110 determines whether object 2 is present in front of vehicle 1. Specifically, first determiner 110 determines whether object 2 is present in front of vehicle 1 by detecting the reflection wave from object 2, using first detector 10 or second detector 20.

When determining that object 2 is present in the traveling direction of vehicle 1, first determiner 110 determines a difference in a time of flight (propagation time) between the first round-trip path and second round-trip path, which is related to the detection wave transmitted by first detector 10.

The first round-trip path is a path of ultrasound between the first position of vehicle 1 and object 2 (see FIG. 2A). The first round-trip path is a path in which detection wave D1 transmitted by first detector 10 travels to object 2 and returns to first detector 10 as first reflection wave D2 after reaching object 2 and being reflected from object 2.

The second round-trip path is a path obtained by adding a path from the first position of vehicle 1 to object 2 and a path from object 2 to the second position of vehicle 1 (see FIG. 2B). The second round-trip path is a path in which detection wave D3 transmitted by first detector 10 reaches second detector 20 as second reflection wave D4 after reaching object 2 and being reflected from object 2.

First determiner 110 determines whether the difference between the first time of flight of the detection wave related to the first round-trip path (a first value) and the second time of flight of the detection wave related to the second round-trip path (a second value) is greater than a predetermined threshold value. The predetermined threshold value is a value based on a difference in path length between the first round-trip path and the second round-trip path, which makes a distance based on the first value related to the first round-trip path and a distance based on the second value related to the second round-trip path substantially the same when object 2 is positioned at a height causing a collision with vehicle 1. The predetermined threshold value is set according to a distance between object 2 and vehicle 1. The predetermined threshold value is set for each distance between object 2 and vehicle 1 because the first time of flight and the second time of flight vary with the distance between object 2 and vehicle 1. Incidentally, the difference between the first value and the second value is to be an absolute value.

As illustrated in FIG. 2A, the detection waves related to the first round-trip path are detection wave D1 transmitted from first detector 10 and first reflection wave D2 reflected from object 2. Further, as illustrated in FIG. 2B, the detection waves related to the second round-trip path are detection wave D3 transmitted from first detector 10 and second reflection wave D4 reflected from object 2.

For example, as illustrated in FIG. 2A, in a case where object 2A, which is like a wall positioned in front of vehicle 1, is present, the difference between the respective times of flight until the detection wave returns to vehicle 1 as the reflection wave via object 2A is not greater than the predetermined threshold value because object 2A is in a position causing a collision with vehicle 1. In this case, first determiner 110 determines that the difference between the first time of flight and the second time of flight is not greater than the predetermined threshold value.

Further, for example, as illustrated in FIG. 2B, in a case where object 2B, which is like a beam positioned at a height such that vehicle 1 does not collide, is present, the difference between the respective times of flight is greater than the predetermined threshold value because object 2B is in a position not causing collision with vehicle 1. In this case, first determiner 110 determines that the difference between the first time of flight and the second time of flight is greater than the predetermined threshold value.

Determination by first determiner 110 may be performed by, for example, comparing a ratio of the second time of flight to the first time of flight and the predetermined threshold value. In this case, the predetermined threshold value is set to a value according to the ratio of the second time of flight to the first time of flight.

Second determiner 120 determines whether object 2 is an obstacle based on a determination result of first determiner 110. Specifically, second determiner 120 determines that object 2 is an obstacle in a case where first determiner 110 determines that the difference between the first time of flight and the second time of flight is not greater than the predetermined threshold value.

In contrast, second determiner 120 determines that object 2 is a non-obstacle in a case where first determiner 110 determines that the difference between the first time of flight and the second time of flight is greater than the predetermined threshold value.

In the manner described above, it is possible to suppress erroneously determining object 2B as an obstacle in a case where object 2B such as a beam that does not collide with vehicle 1 is present in the traveling direction of vehicle 1.

When determining that object 2 is an obstacle, obstacle determination apparatus 100 outputs, depending on a distance to object 2, a limit control command such as brake control and/or control for reducing the speed of vehicle to a travel control apparatus (not illustrated). In contrast, when determining that object 2 is a non-obstacle, obstacle determination apparatus 100 does not output a control command limiting the travel of vehicle 1.

Figure 3:
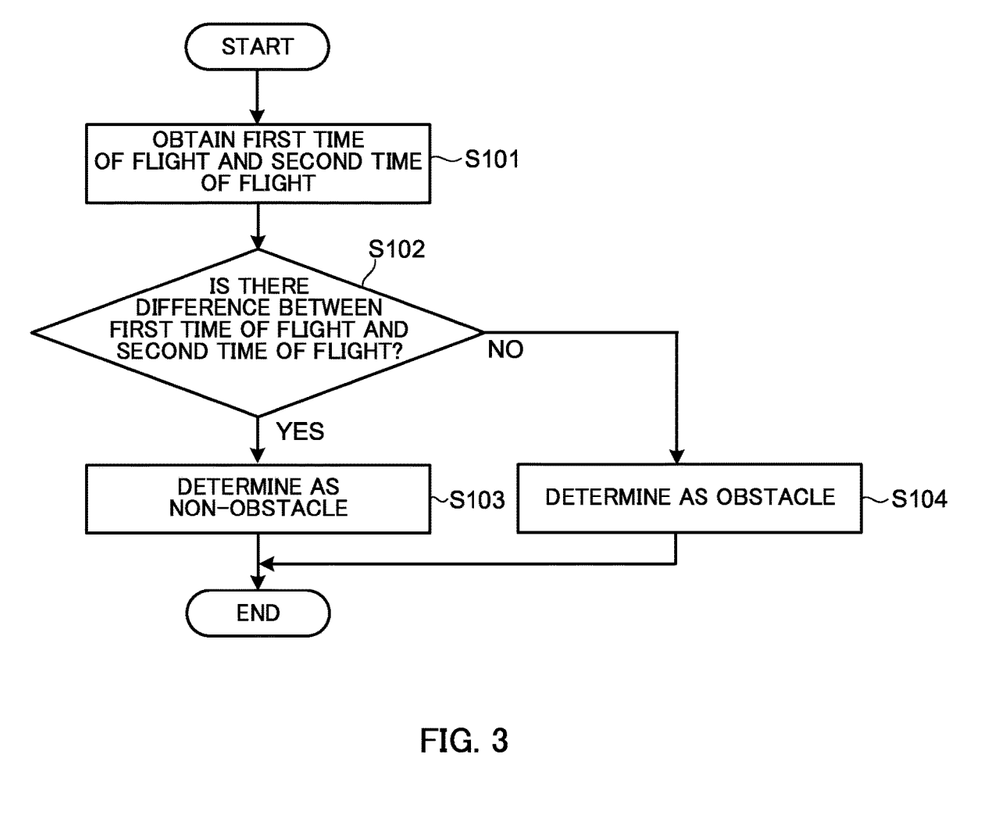
FIG. 3 is a flowchart illustrating an exemplary operation of determination control in the obstacle determination apparatus.

A description will be given of an exemplary operation of determination control in obstacle determination apparatus 100 configured as described above. FIG. 3 is a flowchart illustrating an exemplary operation of determination control in obstacle determination apparatus 100. Processing in FIG. 3 assumes the detection of an object in front of vehicle 1 and is appropriately performed, for example, while a vehicle is traveling.

As illustrated in FIG. 3, obstacle determination apparatus 100 obtains the first time of flight and the second time of flight (step S101). Next, obstacle determination apparatus 100 determines whether there is a difference between the first time of flight and the second time of flight (step S102). Note that, in step S102, in a case where the difference between the first time of flight and the second time of flight is not greater than the predetermined threshold value, it is determined that there is no difference between the first time of flight and the second time of flight, and in a case where the difference between the first time of flight and the second time of flight is greater than the predetermined threshold value, it is determined that there is a difference between the first time of flight and the second time of flight.

When a determination result indicates that there is a difference between the first time of flight and the second time of flight (step S102, YES), obstacle determination apparatus 100 determines that the object is a non-obstacle (step S103).

On the other hand, when there is no difference between the first time of flight and the second time of flight (step S102, NO), obstacle determination apparatus 100 determines that the object is an obstacle (step S104). After step S103 or step S104, the control ends.

According to the present embodiment configured as described above, whether the object is an obstacle is determined based on the presence or absence of a difference between the first time of flight related to the first round-trip path and the second time of flight related to the second round-trip path. As a result, it is possible to suppress erroneously determining, as an obstacle, an object such as a beam that does not collide with vehicle 1. That is, in the present embodiment, the determination accuracy of the obstacle can be improved.

Thus, limit control for safety improvement in vehicle 1 due to the erroneous determination is not executed. Accordingly, it is possible to suppress occurrence of a situation where a driver feels unpleasant or suppress affecting the traveling of another vehicle due to the limit control based on the erroneous determination.

Further, since the determination control is executed for object 2 in front of vehicle 1, it is possible to suppress executing wasteful determination control with respect to an object that is not in front of vehicle 1.

Second Embodiment

Figure 4:
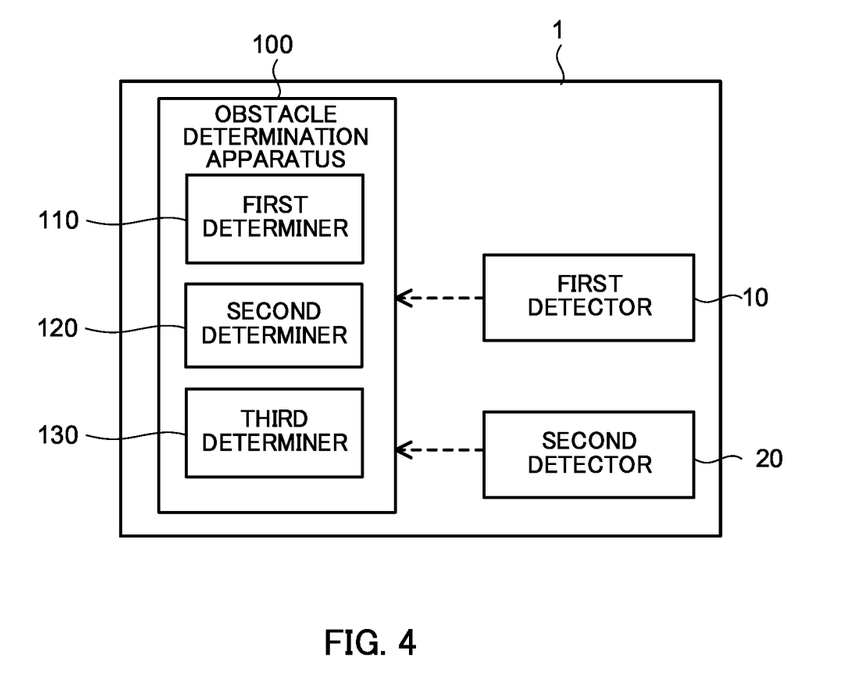
FIG. 4 is a block diagram illustrating a vehicle to which an obstacle determination apparatus according to a second embodiment of the present disclosure is applied.

Next, a second embodiment of the present disclosure will be described. FIG. 4 is a block diagram illustrating vehicle 1 to which obstacle determination apparatus 100 according to the second embodiment of the present disclosure is applied.

As illustrated in FIG. 4, vehicle 1 includes, similar to the first embodiment, first detector 10, second detector 20 and obstacle determination apparatus 100. First detector 10 and second detector 20 are the same as in the first embodiment.

Figure 5A:
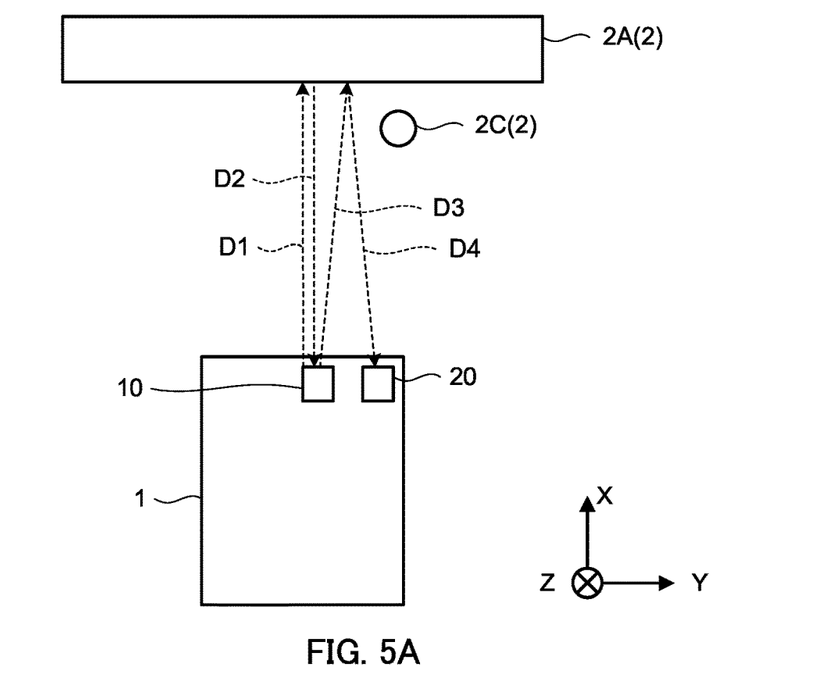
FIG. 5A describes detection of an object having a plane.
Figure 5B:
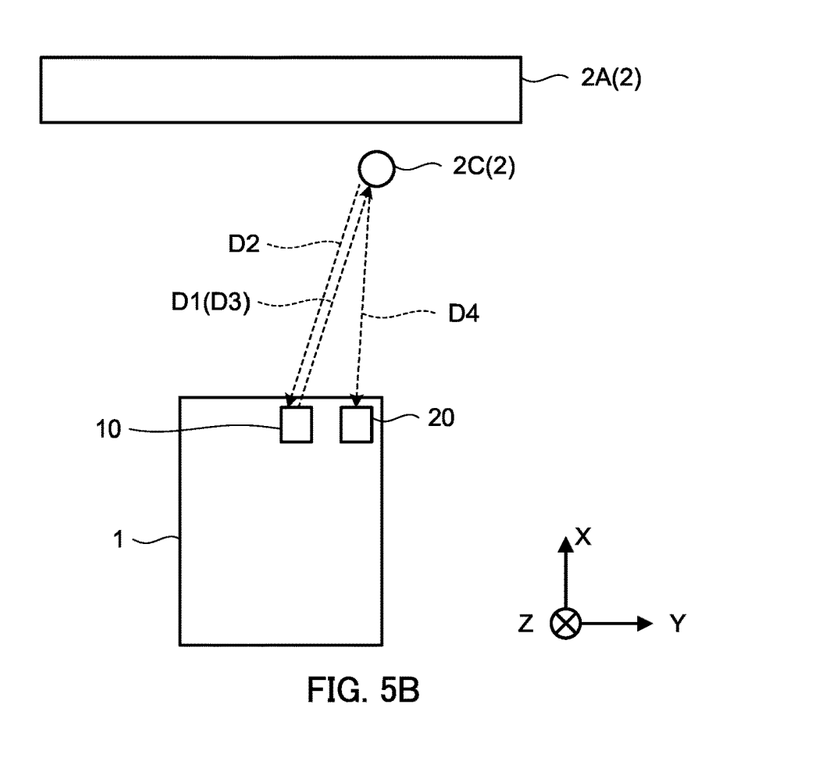
FIG. 5B describes detection of an object having no plane.

Incidentally, a position of first detector 10 (first position) is a position corresponding to a center of the Y direction in a front part of vehicle 1, and a position of second detector 20 (second position) is a position corresponding to an end of the Y direction in the front part of vehicle 1 (see FIGS. 5A and 5B). Moreover, a positional relationship in the height direction between the first position and the second position is the same as that of the first embodiment. Note that, the positional relationship between first detector 10 and second detector 20 may be reversed.

Obstacle determination apparatus 100 incudes third determiner 130 as well as first determiner 110 and second determiner 120.

Third determiner 130 determines whether object 2 in front of vehicle 1 has a plane parallel to an orthogonal direction (Y direction), which is orthogonal to a traveling direction of vehicle 1 (X direction) and a height direction of vehicle 1 (Z direction).

Determination by third determiner 130 as to whether object 2 has a plane parallel to the Y direction is performed by, for example, conventional techniques to calculate a plurality of coordinates of a surface of object 2, using first detector 10 and second detector 20.

Third determiner 130 determines that object 2 has a plane perpendicular to the traveling direction of vehicle 1 in a case where, for example X-direction components of vehicle 1 (traveling direction components) are substantially the same in the plurality of calculated coordinates.

In a case where third determiner 130 determines that object 2 has a plane perpendicular to the traveling direction of vehicle 1, first determiner 110, as in the first embodiment, determines a relationship between a first round-trip path and a second round-trip path.

For example, assuming that the respective positions of first detector 10 and second detector 20 in the Y-direction are different from each other, when, as illustrated in FIG. 5A, a wall in front of vehicle 1 is object 2A having a plane perpendicular to the traveling direction of vehicle 1, a time of flight of detection wave D1 (distance of the path) and a time of flight of second reflection wave D4 (distance of the path) are the same from each other with respect to a path until detection wave D1 transmitted from first detector 10 reaches object 2 (going path) and a path until a reflection wave from object 2 returns to second detector 20 (returning path).

Thus, there is no need to consider an effect of the difference between the respective positions of first detector 10 and second detector 20 in the Y direction. This allows accurately detecting a difference between the first time of flight of the detection waves (D1 and D2) related to the first round-trip path and the second time of flight of the detection waves (D3 and D4) related to the second round-trip path at different height positions of first detector 10 and second detector 20.

However, as illustrated in FIG. 5B, with respect to object 2C such as a pole positioned on an end of the traveling direction of vehicle 1, the path of detection waves (D3 and D4) related to the second round-trip path does not form an isosceles triangular shape. Hence, the difference between the time of flight of the detection wave related to the first round-trip path and the time of flight of the detection wave related to the second round-trip path becomes large; thus, object 2C that should be an obstacle may be determined as a non-obstacle.

By contrast, in the present embodiment, determination control by first determiner 110 and second determiner 120 is applied to object 2A having a plane while the determination control is not applied to object 2C having no plane perpendicular to the traveling direction of vehicle 1. This allows suppressing determining object 2C like a pole as a non-obstacle.

Note that, whether object 2C like a pole is an obstacle may be determined by another control.

Figure 6:
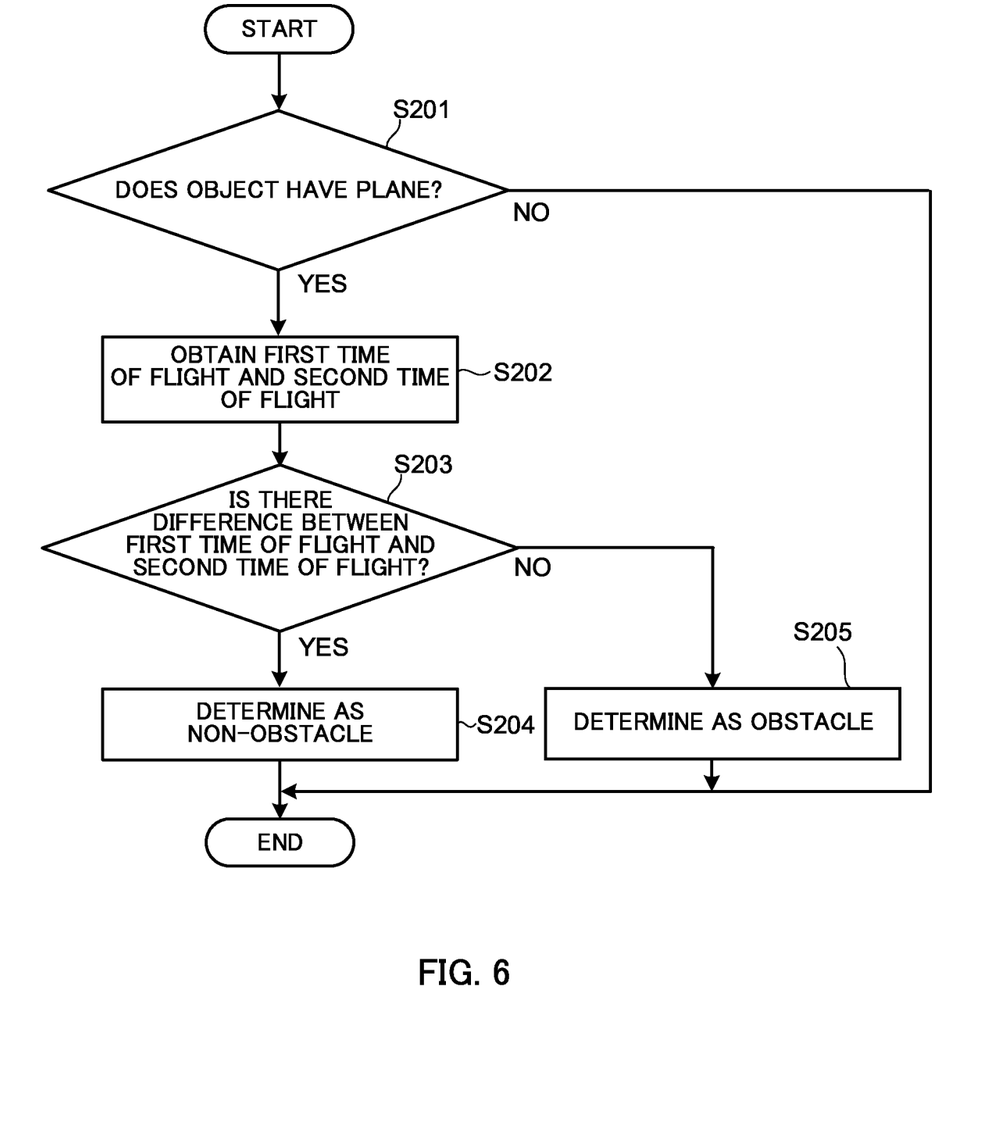
FIG. 6 is a flowchart illustrating an exemplary operation of determination control in the obstacle determination apparatus according to the second embodiment of the present disclosure.

A description will be given of an exemplary operation of determination control in obstacle determination apparatus 100 according to the second embodiment, configured as described above. FIG. 6 is a flowchart illustrating an exemplary operation of determination control in obstacle determination apparatus 100 according to the second embodiment. Processing in FIG. 6 assumes the detection of an object in front of vehicle 1 and is appropriately performed, for example, while a vehicle is traveling.

As illustrated in FIG. 6, obstacle determination apparatus 100 determines whether object 2 has a plane perpendicular to the traveling direction of vehicle 1 (step S201). When a determination result indicates that object 2 has no plane perpendicular to the traveling direction of vehicle 1 (step S201, NO), the control ends.

On the other hand, when the object has a plane perpendicular to the traveling direction of vehicle 1 (step S201, YES), obstacle determination apparatus 100 obtains the first time of flight and the second time of flight (step S202). Next, obstacle determination apparatus 100 determines whether there is a difference between the first time of flight and the second time of flight (step S203).

When a determination result indicates that there is a difference between the first time of flight and the second time of flight (step S203, YES), obstacle determination apparatus 100 determines that object 2 is a non-obstacle (step S204).

On the other hand, when there is no difference between the first time of flight and the second time of flight (step S203, NO), obstacle determination apparatus 100 determines that the object is an obstacle (step S205). After step S204 or step S205, the control ends.

According to the second embodiment configured as described above, it is possible to improve determination accuracy of an obstacle. In addition, since object 2 having no plane perpendicular to the traveling direction of vehicle 1 can be excluded from determination objects, the determination accuracy of the obstacle can be further improved.

Third Embodiment

Next, a third embodiment of the present disclosure will be described. Obstacle determination apparatus 100 according to the third embodiment of the present disclosure has the same configuration as that of obstacle determination apparatus 100 according to the first embodiment or the second embodiment.

Figure 7:
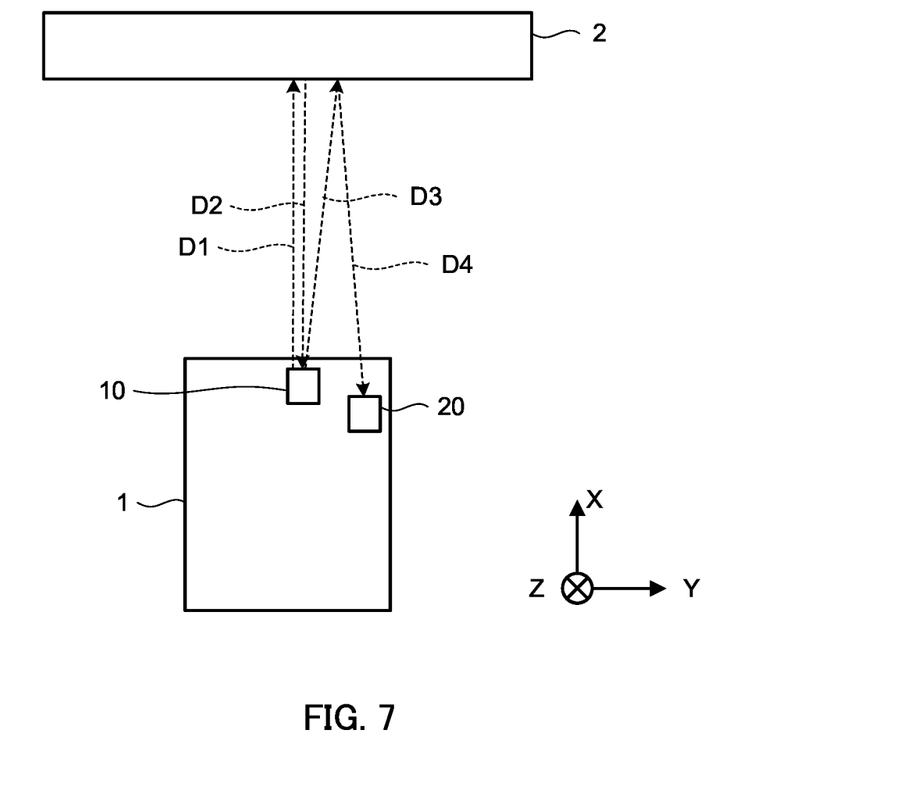
FIG. 7 illustrates an exemplary vehicle in which the first detector and the second detector are arranged so as to be shifted in a traveling direction.

Further, as illustrated in FIG. 7, second detector 20 of vehicle 1 is provided at a position which is different from first detector 10 in the X-direction. That is, a first position and a second position are different from each other in both a height position and a position of a traveling direction in vehicle 1. Note that, with respect to the first position and the second position, either one of the height position and the position of the traveling direction in vehicle 1 may be different from each other. Moreover, the positions of first detector 10 and second detector 20 may be reversed.

First determiner 110 calculates a first expected value when object 2 is an obstacle and a second expected value when object 2 is a non-obstacle, using a first parameter based on a first round-trip path.

The first parameter is a horizontal distance between vehicle 1 and object 2, the distance of which is calculated based on a first time of flight of detection waves (D1 and D2) in the first round-trip path.

The first expected value is a distance in a second round-trip path when object 2 is assumed to be an obstacle (e.g., an opposing wall). Based on the first parameter, coordinates of the first position (position of first detector 10), and coordinates of the second position (position of second detector 20), the first expected value is calculated by, for example, equation 1.

[1]
$$E1 = \sqrt{L1^2 + \left(\frac{L1 \times Dyz}{2 \times L1 + Dx}\right)^2} + \sqrt{(L1+Dx)^2 + \left\{\frac{(L1+Dx) \times Dyz}{2 \times L1 + Dx}\right\}^2} \quad \text{(Equation 1)}$$

In equation 1, E1 denotes the first expected value. L1 denotes the first parameter. Dx denotes a difference between an X coordinate of the first position and an X coordinate of the second position. Dyz denotes a value calculated from Y and Z coordinates of the first position and Y and Z coordinates of the second position, and also is a distance between the first position and the second position in a YZ plane. Note that, information on the X, Y, and Z coordinates of the first position and X, Y, and Z coordinates of the second position is a value previously held as a parameter.

The second expected value is a distance in the second round-trip path when object 2 is assumed to be an obstacle (e.g., beam). Based on the first parameter, the coordinates of the first position, the coordinates of the second position, and a Z component of the obstacle, the second expected value is calculated by, for example, equation 2.

[2]
$$E2 = \sqrt{L2^2 + \left(\frac{L2 \times Dy}{2 \times L2 + Dx}\right)^2 + (Z1 - Z2)^2} + \sqrt{(L2+Dx)^2 + \left\{\frac{(L2+Dx) \times Dy}{2 \times L2 + Dx}\right\}^2 + (Z1 - Z3)^2} \quad \text{(Equation 2)}$$

In equation 2, E2 denotes the second expected value. L2 denotes the first parameter, but since it is a value assuming that object 2 is a beam, L2 is calculated by equation 3. Z1 denotes the Z component of a coordinate of the object. Z2 denotes the Z component of coordinates of the first position. Z3 denotes the Z component of coordinates of the second position. Incidentally, the symbols in equation 2 common to equation 1 represents the same in equation 1. Note that, information on Z1, Z2, and Z3 is a value previously held as a parameter.

[3]
$$L2 = \sqrt{L1^2 - (Z1-Z2)^2} \quad \text{(Equation 3)}$$

First determiner 110 determines whether the second parameter based on the second round-trip path is close to the first expected value or the second expected value. The second parameter is a distance of the second round-trip path calculated based on the second time of flight of detection waves (D3 and D4) in the second round-trip path.

Specifically, first determiner 110 compares a first absolute value, which is a difference between the second parameter and the first expected value, with a second expected value, which is a difference between the second parameter and second expected value. First determiner 110 determines that object 2 is a non-obstacle in a case where the first absolute value is greater than the second absolute value. In contrast, first determiner 110 determines that object 2 is an obstacle in a case where the first absolute value is not greater than the second absolute value. That is, after determining whether an actual propagation distance or propagation time is close to the first expected value or the second expected value, whether the object is an obstacle is determined.

Incidentally, first determiner 110 may compare a value obtained by adding a predetermined offset to the above-mentioned first absolute value with the second absolute value. In this case, first determiner 110 determines that object 2 is a non-obstacle in a case where a sum of the first absolute value and the predetermined offset is greater than the second absolute value. In contrast, first determiner 110 determines that object 2 is an obstacle in a case where the sum of the first absolute value and the predetermined offset is not greater than the second absolute value.

With the configuration of the present embodiment, it is possible to suppress erroneously determining, as an obstacle, an object such as a beam even when, for example, there is a shift of the traveling direction component in arrangement positions of first detector 10 and second detector 20.

Figure 8:
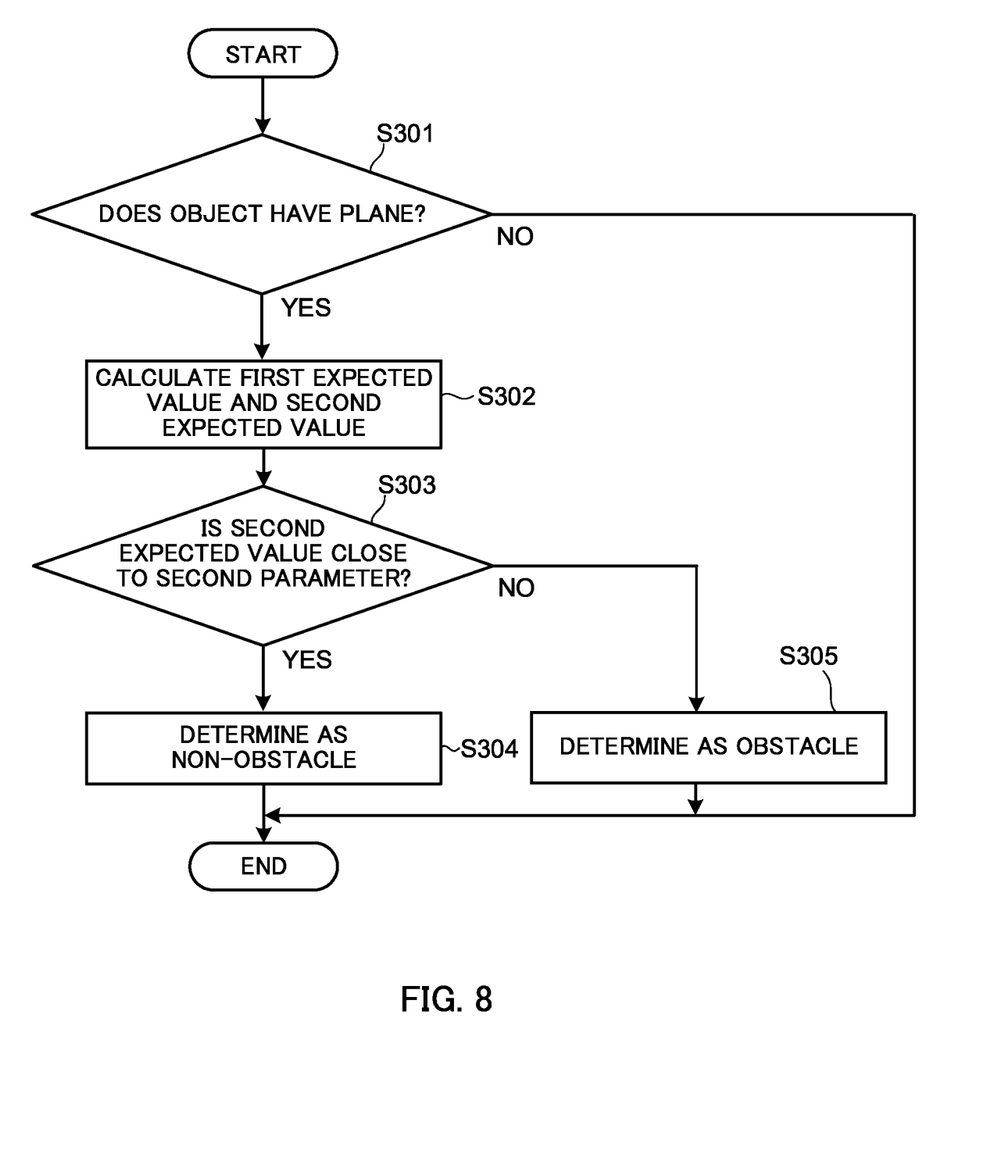
FIG. 8 is a flowchart illustrating an exemplary operation of determination control in an obstacle determination apparatus according to a third embodiment of the present disclosure.

A description will be given of an exemplary operation of determination control in obstacle determination apparatus 100 according to the third embodiment, configured as described above. FIG. 8 is a flowchart illustrating an exemplary operation of determination control in obstacle determination apparatus 100 according to the third embodiment. Processing in FIG. 8 assumes the detection of an object in front of vehicle 1 and is appropriately performed, for example, while a vehicle is traveling.

As illustrated in FIG. 8, obstacle determination apparatus 100 determines whether the object has a plane perpendicular to the traveling direction of vehicle 1 (step S301). When a determination result indicates that the object has no plane perpendicular to the traveling direction of the vehicle (step S301, NO), the control ends.

On the other hand, when the object has a plane perpendicular to the traveling direction of the vehicle (step S301, YES), obstacle determination apparatus 100 calculates the first expected value and the second expected value (step S302). Obstacle determination apparatus 100 then determines whether the second parameter is closer to the second expected value than the first expected value (step S303). Note that, in the present embodiment, the first expected value and second expected value are calculated; however, the present disclosure is not limited to this configuration. Calculating three or more expected values and comparing the calculated values with the second parameter, respectively, may be acceptable. Further, obstacle determination apparatus 100 according to the present embodiment determines whether the second parameter is close to the first expected value or the second expected value; however, the present disclosure is not limited to this. For example, whether the object is an obstacle is determined by following: calculating a ratio of the difference between the second parameter and the first expected value to the difference between the second parameter and the second expected value, and comparing then the ratio with a predetermined threshold value. As described above, obstacle determination apparatus 100 according to the present embodiment determines whether the object is an obstacle, based on the actual propagation distance or propagation time, the first expected value, and the second expected value.

When a determination result indicates that the second parameter is closer to the second expected value (step S303, YES), obstacle determination apparatus 100 determines that the object is a non-obstacle (step S304).

On the other hand, when the second parameter is not close to the second expected value (step S303, NO), obstacle determination apparatus 100 determines that the object is an obstacle (step S305). After step S304 or step S305, the control ends.

According to the third embodiment configured as described above, it is possible to improve determination accuracy of an obstacle. Note that, in the third embodiment, there is no need to determine the difference in the propagation distance or propagation time, unlike in the first embodiment and the second embodiment. Whether the object is an obstacle is determined by comparing the relationship between the second parameter and the first expected value with the relationship between the second parameter and the second expected value.

According to the third embodiment configured as described above, it is possible to improve determination accuracy of an obstacle. In addition, since the determination control of the obstacle is executed after calculating the expected value in consideration of the positions of the respective detectors, a determination error due to positional shifting of the detectors can be absorbed, and thus the determination accuracy of the obstacle can be further improved.

Note that, in the above embodiments, the first detector and second detector are the ultrasonic sensors; however, the present disclosure is not limited to this. The detector may be other than an ultrasonic sensor such as a radar, as long as it is capable of transmitting and receiving a detection wave.

Further, in the above embodiments, the first detector and second detector are provided in the front part of the vehicle; however, the present disclosure is not limited to this. The detector may be provided in a rear part or the like of the vehicle.

Further, in the above embodiments, the determiners are provided separately; however, the present disclosure is not limited to this. For example, one determiner may perform each determination.

Further, in the above-described first and second embodiments, the first value and the second value which are used to detect the difference in the going path and returning path are the times of flights; however, the present disclosure is not limited to this. The value may be, for example, a distance (propagation distance) based on the time of flight.

Further, in the above-described first and second embodiments, the criterion for determining the difference between the first value and the second value is assumed to be the ratio of the second value to the first value; however, the present disclosure is not limited to this. As long as the criterion is capable of determining the difference between the first value and the second value, any criterion is possible, such as the ratio of the square of the second value to the square of the first value or the difference between the first value and the second value.

In the above third embodiment, the first expected value, the second expected value, the first parameter and the second parameter are assumed to be the distances of the round-trip paths (propagation distances); however, the present disclosure is not limited to this. The time during which the detection wave flies the round-trip path (propagation time) may be calculated to be used as the first expected value, the second expected value, the first parameter and the second parameter.

Further, in the above embodiments, the obstacle determination is performed for an object in front of the vehicle; however, the present disclosure is not limited to this. For example, the obstacle determination may be performed for an object in rear of the vehicle.

Further, in the above embodiments, the obstacle determination apparatus is used to suppress erroneously determining, as an obstacle, the beam above the vehicle; however, the present disclosure is not limited to this. For example, in the above embodiments, the present disclosure can also be used to suppress a step in rear of the vehicle from being erroneously determined as the obstacle.

Further, in the above embodiments, the vehicle is exemplified as the moving body; however, the present disclosure is not limited to this. The moving body other than a vehicle is possible.

The embodiments described above are merely examples of specific implementation of the present invention, and the technical scope of the present invention should not be restrictively interpreted by these embodiments. That is, the present invention may be implemented in various forms without departing from the spirit thereof or the major features thereof.

While various embodiments have been described herein above, it is to be appreciated that various changes in form and detail may be made without departing from the spirit and scope of the invention(s) presently or hereafter claimed.

This application is entitled and claims the benefit of Japanese Patent Application No. 2020-132554, filed on Aug. 4, 2020, the disclosure of which including the specification, drawings and abstract is incorporated herein by reference in its entirety.

INDUSTRIAL APPLICABILITY

An obstacle determination apparatus of the present disclosure is useful for an obstacle determination apparatus and a vehicle which are capable of improving determination accuracy of obstacles.

The invention claimed is:

1. An obstacle determination apparatus, comprising:
a first determiner determining a difference in a propagation distance or a propagation time between a first round-trip path of a detection wave between a first position of a moving body and an object, and a second round-trip path of a detection wave from the first position to a second position of the moving body via the object, the second position being different from the first position; and
a second determiner determining whether the object is an obstacle based on a determination result of the first determiner.

2. The obstacle determination apparatus according to claim 1, wherein
the first position and the second position are different from each other in height of the moving body, and
the second determiner determines that the object is a non-obstacle in a case where the first determiner determines that the difference is greater than a threshold value.

3. The obstacle determination apparatus according to claim 1, wherein
the first determiner calculates a first expected value and a second expected value, using a first parameter based on the first round-trip path, the first expected value corresponding to a propagation distance or a propagation time when the object is an obstacle, the second expected value corresponding to a propagation distance or a propagation time when the object is a non-obstacle; and the second determiner determines whether the object is an obstacle based on a second parameter based on the second round-trip path, the first expected value, and the second expected value.

4. The obstacle determination apparatus according to claim 3, wherein
the second determiner determines whether the object is an obstacle by comparing a first absolute value with a second absolute value, the first absolute value being a difference between the second parameter and the first expected value, the second absolute value being a difference between the second parameter and the second expected value.

5. The obstacle determination apparatus according to claim 3, wherein
the second determiner determines whether the object is an obstacle by comparing a value obtained by adding a predetermined offset to a first absolute value, with a second absolute value, the first absolute value being a difference between the second parameter and the first expected value, the second absolute value being a difference between the second parameter and the second expected value.

6. The obstacle determination apparatus according to claim 3, wherein
the second determiner determines whether the object is an obstacle by calculating a ratio of a first absolute value to a second absolute value and comparing the ratio with a predetermined threshold value, the first absolute value being a difference between the second parameter and the first expected value, the second absolute value being a difference between the second parameter and the second expected value.

7. The obstacle determination apparatus according to claim 1, further comprising:
a third determiner determining whether the object has a plane perpendicular to a traveling direction of the moving body, wherein
the first determiner determines the difference in a case where the third determiner determines that the object has the plane.

8. The obstacle determination apparatus according to claim 2, further comprising:
a third determiner determining whether the object has a plane perpendicular to a traveling direction of the moving body, wherein
the first determiner determines the difference in a case where the third determiner determines that the object has the plane.

9. The obstacle determination apparatus according to claim 3, further comprising:
a third determiner determining whether the object has a plane perpendicular to a traveling direction of the moving body, wherein
the first determiner determines the difference in a case where the third determiner determines that the object has the plane.

10. The obstacle determination apparatus according to claim 4, further comprising:
a third determiner determining whether the object has a plane perpendicular to a traveling direction of the moving body, wherein
the first determiner determines the difference in a case where the third determiner determines that the object has the plane.

11. The obstacle determination apparatus according to claim 5, further comprising:

a third determiner determining whether the object has a plane perpendicular to a traveling direction of the moving body, wherein
the first determiner determines the difference in a case where the third determiner determines that the object has the plane.

12. The obstacle determination apparatus according to claim 6, further comprising:
a third determiner determining whether the object has a plane perpendicular to a traveling direction of the moving body, wherein
the first determiner determines the difference in a case where the third determiner determines that the object has the plane.

13. A vehicle, comprising:
an obstacle determination apparatus;
a first detector being provided at a first position, transmitting a detection wave for detecting an object, and receiving a first reflection wave resulting from the transmitted detection wave being reflected from the object; and
a second detector being provided at a second position and receiving a second reflection wave resulting from the detection wave being reflected from the object,
wherein the obstacle determination apparatus includes:
a first determiner determining a difference in a propagation distance or a propagation time between a first round-trip path of a detection wave between the first position of a moving body and an object, and a second round-trip path of a detection wave from the first position to the second position of the moving body via the object, the second position being different from the first position; and
a second determiner determining whether the object is an obstacle based on a determination result of the first determiner.

14. The vehicle according to claim 13, wherein
the first position and the second position are different from each other in height of the moving body, and
the second determiner determines that the object is a non-obstacle in a case where the first determiner determines that the difference is greater than a threshold value.

15. The vehicle according to claim 13, wherein
the first determiner calculates a first expected value and a second expected value, using a first parameter based on the first round-trip path, the first expected value corresponding to a propagation distance or a propagation time when the object is an obstacle, the second expected value corresponding to a propagation distance or a propagation time when the object is a non-obstacle; and
the second determiner determines whether the object is an obstacle based on a second parameter based on the second round-trip path, the first expected value, and the second expected value.

16. The vehicle according to claim 15, wherein
the second determiner determines whether the object is an obstacle by comparing a first absolute value with a second absolute value, the first absolute value being a difference between the second parameter and the first expected value, the second absolute value being a difference between the second parameter and the second expected value.

17. The vehicle according to claim 15, wherein
the second determiner determines whether the object is an obstacle by comparing a value obtained by adding a predetermined offset to a first absolute value, with a second absolute value, the first absolute value being a difference between the second parameter and the first expected value, the second absolute value being a difference between the second parameter and the second expected value.

18. The vehicle according to claim 15, wherein
the second determiner determines whether the object is an obstacle by calculating a ratio of a first absolute value to a second absolute value and comparing the ratio with a predetermined threshold value, the first absolute value being a difference between the second parameter and the first expected value, the second absolute value being a difference between the second parameter and the second expected value.

19. The vehicle according to claim 13, further comprising:
a third determiner determining whether the object has a plane perpendicular to a traveling direction of the moving body, wherein
the first determiner determines the difference in a case where the third determiner determines that the object has the plane.

20. The vehicle according to claim 14, further comprising:
a third determiner determining whether the object has a plane perpendicular to a traveling direction of the moving body, wherein
the first determiner determines the difference in a case where the third determiner determines that the object has the plane.

* * * * *